E. T. COLLINGS.
SPRING HARROW TOOTH.
APPLICATION FILED AUG. 1, 1912.

1,077,806.

Patented Nov. 4, 1913.

Witnesses

Inventor
Edward T. Collings.
By
Attorneys

UNITED STATES PATENT OFFICE.

EDWARD T. COLLINGS, OF PHOENIX, ARIZONA.

SPRING HARROW-TOOTH.

1,077,806.  Specification of Letters Patent.  Patented Nov. 4, 1913.

Application filed August 1, 1912.  Serial No. 712,736.

*To all whom it may concern:*

Be it known that I, EDWARD T. COLLINGS, a citizen of the United States, residing at Phoenix, in the county of Maricopa and State of Arizona, have invented certain new and useful Improvements in Spring Harrow-Teeth; and I do hereby declare the following to be a full, clear, and exact description of the invention, such as will enable others skilled in the art to which it appertains to make and use the same.

This invention relates to improvements in harrow teeth, and has as an object to provide a tooth having a rounded earth part which will not bark the roots of plants when the harrow is used as a cultivator.

A further object of the invention is to provide a tooth of this type with a body of flexible material, and a point of reinforced rigid material.

With these and other objects in view which will appear as the description proceeds the invention resides in the combination and arrangement of parts more fully described in the specification and claim.

Figure 1:
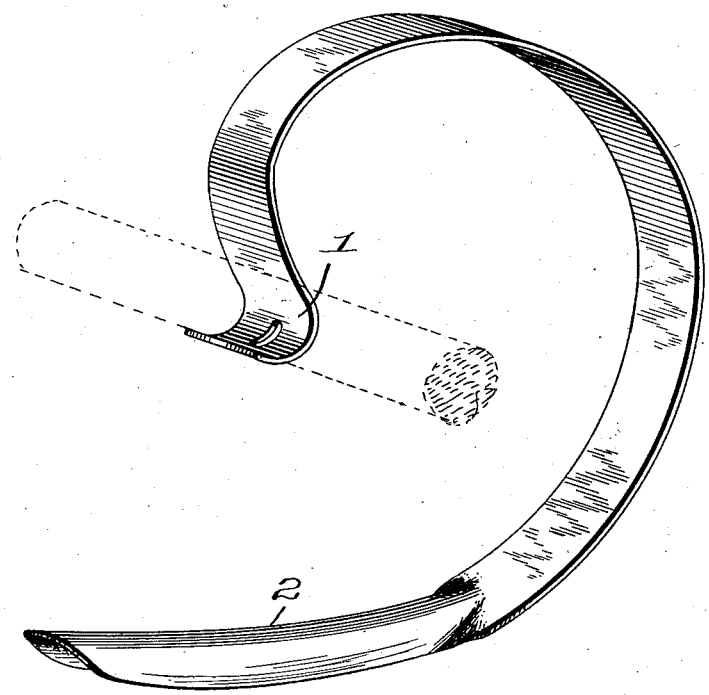
Figure 2:
Figure 3:
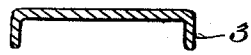

In the drawing; Figure 1 is a perspective view of my improved harrow tooth, a connecting beam being shown in dotted lines. Fig. 2 shows a transverse sectional view of the point of the tooth. Fig. 3 shows a section of a modified view of point.

Like reference characters designate corresponding parts throughout the drawings.

The present types of harrow teeth as actually used are flat throughout their length, which makes them flexible and prevents their digging deep enough in the ground to act as a cultivator. Also, the sharp edges of the flat type of tooth bark the roots of grain, which objectional feature I have effectually overcome by providing the earth part of the tooth with a rounded surface which has no tendency to bark the roots of the plants being cultivated. I find also that this design of tooth is not so hard to pull through the ground. In so much as the point is rounded off the earth naturally falls to both sides of the tooth without having to be bodily lifted from the ground as is the case with the flat tooth.

Referring to the drawings it will be seen that the end 1 is given any desirable bend which will enable it to be securely fastened to a cross beam. After being given the desired curvature the earth part indicated generally at 2 is rounded, as shown more clearly in Fig. 2. The end of the part 2 is also rounded. This rounded point is designed to be long enough to cultivate as deeply as will be necessary for the particular grain being worked. Obviously any suitable method may be used for rounding the point 2 and no particular method will be described herein.

Fig. 3, which shows a section through a modified point 2 indicates that the tooth may have its edges bent back as indicated at 3, substantially at right angles to the forward face of the tooth, the corners where the angle occurs being rounded to prevent the barking of the roots. It will be seen that these bent back portions 3 not only provide a means for rounding off the edges of the tooth, but also provide a reinforcing strip along each edge which serves to keep the whole point of the tooth rigid. This same reinforcement is accomplished in the form shown in Fig. 2, but to a somewhat less extent.

From the description it will be seen that a very simple means has been adopted for providing a tooth with a reinforced point which will not only not bark the roots, but will also cut deeper into the ground because of the rigidity of the said point. Also, that part of the tooth which engages the ground will not have much spring and an unusual pressure which may be brought to bear upon point 2 as a whole will be taken care of in the curved flat part of the tooth.

I claim:

A harrow tooth formed from a single length of flat metal, one end thereof constituting the attaching end, the metal being curved from said attaching end to form a resilient body portion terminating at its free end in a substantially horizontal earth-engaging portion, said earth-engaging portion being substantially straight longitudinally and having its side edges bent downwardly, the extreme end of said earth-engaging portion being rounded.

In testimony whereof I affix my signature in presence of two witnesses.

EDWARD T. COLLINGS.

Witnesses:
  W. D. AUNGST,
  B. KAVANAGH.

Copies of this patent may be obtained for five cents each, by addressing the "Commissioner of Patents, Washington, D. C."